United States Patent
Kikuchi et al.

(10) Patent No.: US 7,051,447 B2
(45) Date of Patent: May 30, 2006

(54) SYSTEM AND METHOD FOR MEASURING COORDINATE USING MULTI-JOINT ARM

(75) Inventors: Akira Kikuchi, Misato (JP); Kenji Araki, Misato (JP); Katsumi Oshiro, Misato (JP)

(73) Assignee: Kosaka Laboratory Ltd., Tokyo (JP)

( * ) Notice: Subject to any disclaimer, the term of this patent is extended or adjusted under 35 U.S.C. 154(b) by 0 days.

(21) Appl. No.: 10/787,483

(22) Filed: Feb. 26, 2004

(65) Prior Publication Data

US 2004/0187332 A1   Sep. 30, 2004

(30) Foreign Application Priority Data

Feb. 28, 2003   (JP) .............................. 2003-054218

(51) Int. Cl.
*G01B 5/004* (2006.01)

(52) U.S. Cl. ........................ 33/503; 33/556; 33/366.11

(58) Field of Classification Search .................. 33/503, 33/556, 559, 600, 608, 1 PT, 1 N, 1 M, 366.11
See application file for complete search history.

(56) References Cited

U.S. PATENT DOCUMENTS

| | | | |
|---|---|---|---|
| 4,659,280 A | | 4/1987 | Akeel |
| 5,189,797 A | | 3/1993 | Granger |
| 5,402,582 A | | 4/1995 | Raab |
| 5,412,880 A | * | 5/1995 | Raab ........................... 33/503 |
| 5,424,623 A | * | 6/1995 | Allen et al. ............ 318/568.18 |
| 5,682,311 A | * | 10/1997 | Clark ........................... 701/50 |
| 5,724,745 A | * | 3/1998 | Brenner et al. ................ 33/503 |
| 5,794,356 A | * | 8/1998 | Raab ........................... 33/503 |
| 5,930,908 A | * | 8/1999 | Patrisso et al. ............... 33/600 |
| 6,249,985 B1 | * | 6/2001 | Piko et al. .................... 33/503 |
| 6,253,458 B1 | * | 7/2001 | Raab et al. ................... 33/503 |
| 6,285,965 B1 | * | 9/2001 | Taenzer ....................... 702/155 |
| 6,354,012 B1 | * | 3/2002 | Pettersson .................... 33/503 |
| 6,519,860 B1 | * | 2/2003 | Bieg et al. .................... 33/503 |
| 6,606,539 B1 | * | 8/2003 | Raab ........................... 33/503 |
| 6,612,044 B1 | * | 9/2003 | Raab et al. ................... 33/503 |
| 6,640,458 B1 | * | 11/2003 | Sawdon ....................... 33/502 |
| 6,725,142 B1 | * | 4/2004 | Koch ........................... 701/50 |
| 6,763,284 B1 | * | 7/2004 | Watanabe et al. ............. 33/503 |
| 6,817,108 B1 | * | 11/2004 | Eaton .......................... 33/503 |
| 2003/0177653 A1 | * | 9/2003 | Granger ....................... 33/556 |
| 2004/0006882 A1 | * | 1/2004 | Raab et al. ................... 33/503 |
| 2004/0016309 A1 | * | 1/2004 | Catala Garcia et al. ....... 33/600 |
| 2004/0111908 A1 | * | 6/2004 | Raab et al. ................... 33/503 |
| 2004/0134105 A1 | * | 7/2004 | Loeb ........................... 37/348 |

FOREIGN PATENT DOCUMENTS

| | | |
|---|---|---|
| JP | S58-34791 | 1/1983 |
| JP | S58-22084 | 11/1983 |

* cited by examiner

*Primary Examiner*—Yaritza Guadalupe
(74) *Attorney, Agent, or Firm*—Finnegan, Henderson, Farabow, Garrett & Dunner LLP

(57) ABSTRACT

Methods and systems for realizing accurate coordinate measurement using a multi-joint measuring arm. A system includes a support member, a multi-joint measuring arm having a first end attached to the support member and a second end at which a probe can be installed, and a processor configured to produce a three-dimensional coordinate corresponding to a position of the probe based on an angle of each joint of the measuring arm. A parameter concerning a posture of the measuring arm is detected exceeding a prescribed value, and a user is warned in accordance with a result of the detection. The prescribed value has been determined, for example, in accordance with a probability that a measurement error due to a user action pulling the measuring arm away from the support member becomes out of an allowable range.

29 Claims, 9 Drawing Sheets

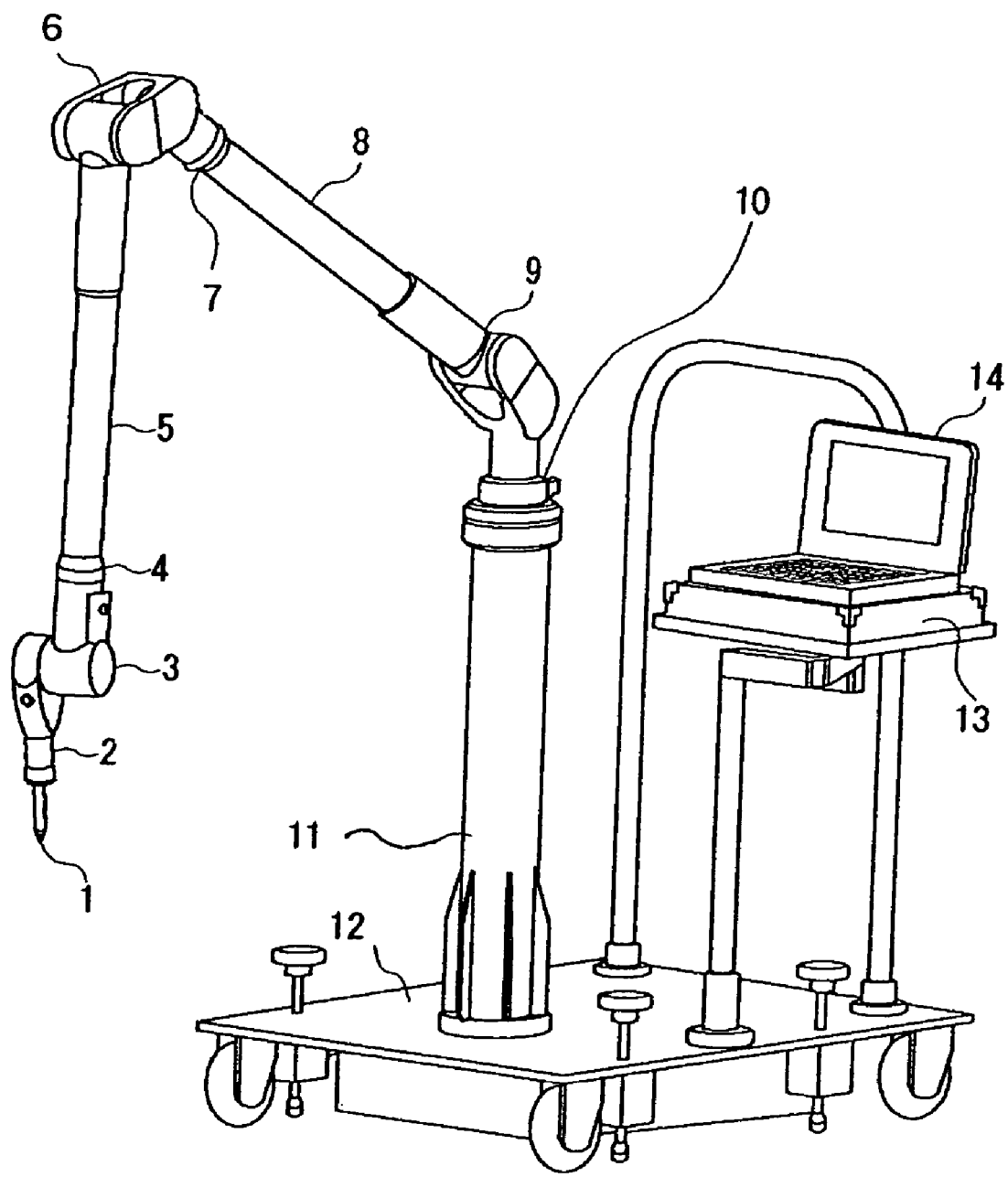
F I G. 1

SYSTEM AND METHOD FOR MEASURING COORDINATE USING MULTI-JOINT ARM

BACKGROUND OF THE INVENTION

Applicants claim the right to foreign priority based on Patent Application Ser. No. JP Application No. 2003-54218, filed Feb. 28, 2003, in Japan.

FIELD OF THE INVENTION

The present invention relates to systems and methods for measuring a three-dimensional coordinate of a selected point on a complicated three-dimensional object to be measured. A user can move a multi-joint measuring arm, which may be called an articulated arm, of a measuring system, and when a contact or noncontact probe attached to the measuring arm is placed on or near the point on the object to be measured, the coordinate measurement is performed.

BACKGROUND

A multi-joint coordinate measuring system, where a freely bendable measuring arm moves through the space and measures a position, dimension, and the like of an object to be measured, incorporates a rotary encoder or other angle sensor in each joint of the measuring arm. Based on the rotation angle of each joint detected by each angle sensor and on the distance between joints of the arm, between a joint and a probe, and the like, the system calculates a three-dimensional coordinate of the probe.

Such a measuring system has been devised in various ways to reduce a measurement error. For example, U.S. Pat. No. 5,402,582 discloses that, if any of the angle sensors approaches its rotational end stop, a light and an audible beep indicates to a user that the user is too close to the end stop and that the orientation of the arm should readjusted.

It is also known that relative misalignments and dimensions of components in the arm are determined to be incorporated in kinematic formulas for generating a three-dimensional coordinate.

However, these known devices are not sufficient for realizing more accurate coordinate measurements.

SUMMARY OF THE INVENTION

Methods and systems consistent with the invention work in association with a system including a support member, a multi-joint measuring arm having a first end attached to the support member and a second end at which a probe can be installed, and a processor configured to produce a three-dimensional coordinate corresponding to a position of the probe based on an angle of each joint of the measuring arm. The system may or may not include a balancer configured to generate a force raising the measuring arm against gravity.

Methods and systems consistent with the invention detect a parameter concerning a posture of the measuring arm exceeding a prescribed value, and provide a warning device configured to warn a user in accordance with a result of the detection. The prescribed value has been determined in accordance with a probability that a measurement error due to a user action pulling the measuring arm away from the support member becomes out of an allowable range.

In a case where the system includes the balancer, methods and systems consistent with the invention detect another parameter concerning a posture of the measuring arm exceeding a prescribed value, and provide a warning device configured to warn a user in accordance with a result of the detection. In this case, the prescribed value has been determined in accordance with a probability that a measurement error due to a user action moving the measuring arm with a change in the force applied to the measuring arm by the balancer becomes out of an allowable range.

Alternatively or additionally, methods and systems consistent with the invention produce a three-dimensional coordinate corresponding to the position of the probe by using a formula including a term for correcting an error due to a change of the force generated by the balancer.

Methods and systems consistent with the invention may work in association with a system including a head member for holding the probe, a first link, a second link, a wrist joint for providing a bending motion between the head member and the first link, an elbow joint for providing a bending motion between the first link and the second link, and a shoulder joint for providing a bending motion between the second link and the support member, in the multi-joint measuring arm. The system may or may not include a balancer, provided in association with the shoulder joint, for generating a force raising the second link on a side of the elbow joint against gravity.

With this system, methods and systems consistent with the invention may provide a warning unit configured to warn a user in response to a detection of at least one of first and second conditions, where the first condition is that an angle between the first and second links exceeds a first value and the second condition is that a distance from a supporting point of the measuring arm to a head point of the measuring arm exceeds a second value.

In a case where the system includes the balancer, methods and systems consistent with the invention may provide a warning unit configured to warn a user in response to a detection of a condition that the shoulder joint provides the second link with a bending motion beyond a range determined based on the force generated by the balancer.

Alternatively or additionally, methods and systems consistent with the invention may input an angle of each joint of the measuring arm into a formula to produce a three-dimensional coordinate corresponding to the position of the probe, where the formula includes a term for correcting an error due to a change of the force generated by the balancer.

As described hereafter, other aspects of the invention exist. Thus, this summary of the invention is intended to provide a few aspects of the invention and is not intended to limit the scope of the invention described and claimed herein.

BRIEF DESCRIPTION OF THE DRAWINGS

The accompanying drawings are incorporated in and constitute a part of this specification. The drawings exem- FIG. 1 illustrates an external view of an exemplary multi-joint coordinate measuring system consistent with the present invention;

DETAILED DESCRIPTION

Figure 2:
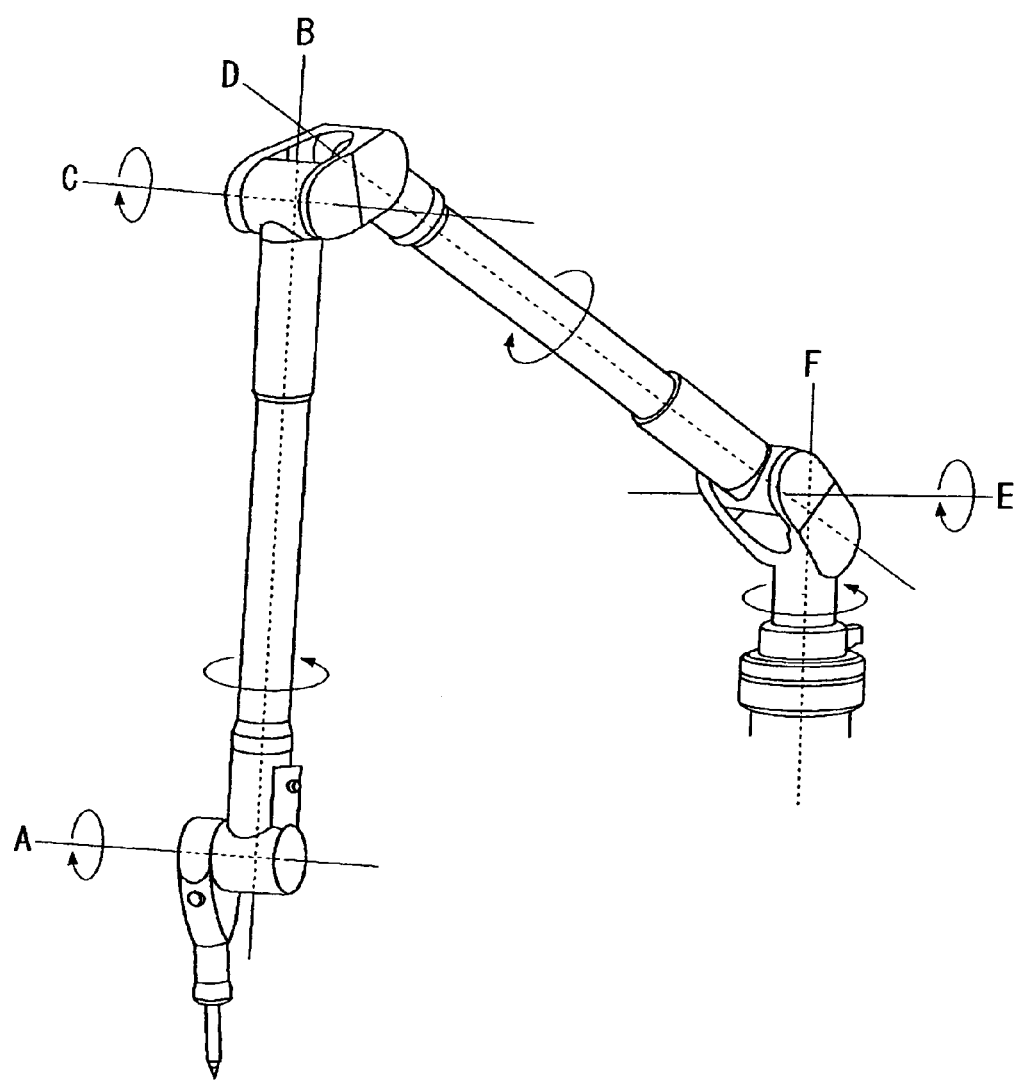
FIG. 2 shows rotational directions of the respective joints of the measuring arm shown in FIG. 1.

The following detailed description refers to the accompanying drawings. Although the description includes exemplary implementations, other implementations are possible and changes may be made to the implementations described without departing from the spirit and scope of the invention. The following detailed description and the accompanying drawings do not limit the invention. Instead, the scope of the invention is defined by the appended claims. Wherever possible, the same reference numbers will be used throughout the drawings and the following description to refer to the same or like parts.

During measurement using the multi-joint coordinate measuring system, if a user applies stress to the measuring system by pulling the measuring arm strongly or shortening it forcibly, a measurement error becomes large due to the arm bends, which results in that the angle sensor does not detect a change of the position that has actually occurred, or conversely results in that the angle sensor indicates rotation though an angle of a joint has not changed, or the like.

A specific posture of the measuring arm which increases a measurement error in such a manner may not be detected by whether or not angles of each joint approach to their respective end stops. If such a specific posture is not detected, the user is obliged to continue measurement without knowing the increase in the measurement error.

Therefore, it is desirable to provide a coordinate measuring system that informs a user whether or not a multi-joint measuring arm is taking an appropriate measurement posture in which good measurement accuracy is maintained.

In another aspect of measurement errors, there exists a structure provided with a balancer around the supporting point of the measuring arm to improve usability and safety of the arm. In this type of structure, a large measurement error can be caused by a change in load force of the balancer. The balancer force changes as a posture of the measuring arm changes, and thus a different stress is applied to the measuring system according to the posture of the arm.

Such a balancer can be formed using, for example, a spring that stores elastic energy according to the amount of the arm's rotation from its neutral position. The balancer thus reduces the force of the measuring arm's own weight which may cause the arm to fall down at its supporting point. This function of the spring allows a user to move the measuring arm lightly during measurement, and reduces the risk of the arm falling when a user stops measuring and takes the hands off the arm.

This force of the spring raising the measuring arm changes according to the amount of the arm's rotation from its neutral position. The neutral position may be a state of the measuring arm standing straight up at the supporting point. The calibration of misalignment may be performed to minimize a measurement error around a point where gravity of the measuring arm balances with the force of the spring raising the measuring arm. In this example, as the measuring arm is raised above the balance point, the force of the balancer actually applied to the arm decreases, and conversely, as the measuring arm is pressed down below the balance point, the force of the balancer actually applied to the arm increases. This difference in the force of the balancer increases the measurement error.

This measurement error due to the difference in the force of the balancer would be reduced if a balancer generating a sufficiently small force was used. However, in this case, safety would have to be compromised, because the measuring arm's own weight would exceed the force of the balancer, which would result in the measuring arm falling at the supporting point when a user takes the hands off.

Therefore, it is also desirable to provide a coordinate measuring system with good measurement accuracy even if a structure in which a force generated by a balancer varies depending on a posture of a measuring arm is adopted.

A multi-joint coordinate measuring system consistent with the present invention comprises a support member, a multi-joint measuring arm having a first end for installation of a probe and a second end for attachment to the support member, and a processor. The arm includes a head member for holding the probe, a first link, a second link, a wrist joint for providing a bending motion between the head member and the first link, an elbow joint for providing a bending motion between the first link and the second link, and a shoulder joint for providing a bending motion between the second link and the support member. The processor is configured to produce a three-dimensional coordinate corresponding to a position of the probe based on an angle of each joint of the measuring arm. The above measuring arm may further include a first joint for providing a twisting motion between the head member and the first link, a second joint for providing a twisting motion between the first link and the second link, and a third joint for providing a twisting motion between the second link and the support member.

When a user pulls the measuring arm and tries to measure a far point, the measurement error may become large and out of an allowable range. Systems and methods consistent with the present invention may warn a user according to a parameter concerning a posture of the measuring arm before the user measures in such a condition, allowing the warned user to bring the arm back to a posture of maintaining good measurement accuracy and to continue measurement. Therefore, sufficiently accurate coordinate measurement can be realized.

As the above parameter, a single parameter (e.g., later-described first or second parameter) may be used. The warning will more surely be given before the measurement error becomes large and out of an allowable range when the first parameter concerning an angle between links of the measuring arm and the second parameter concerning a distance of the measuring arm's reach are used together.

The first parameter is set to give a warning when an angle, for example, between the first link and the second link exceeds or approaches an angle limit (e.g., 170 degrees) that assures desired measurement accuracy. The angle between the first and second links can be determined based on an angle of the elbow joint. The first parameter is selected because as the angle approaches 180 degrees, the measuring arm is closer to being fully stretched, causing the measurement error to become larger.

The second parameter is set to give a warning when a distance, for example, between the wrist joint and a supporting point of the measuring arm exceeds or approaches a distance limit (e.g., 1300 mm when a fully stretched distance between the wrist joint and the supporting point of the measuring arm is 1350 mm) that assures desired measurement accuracy. The second parameter is selected because as the distance increases, the measuring arm is closer to being fully stretched.

Here, the distance between the wrist joint and the supporting point of the measuring arm is used as an example of the distance of the measuring arm's reach. This is because a user tends to move the measuring arm by gripping around the wrist joint of the measuring arm and, in such a case, a force exerted on the probe or the head member for holding the probe may not be so large as it causes a measurement error. For a system in which a user tends to move a measuring arm by gripping around a probe or a head member for holding the probe, a distance between a predetermined point (e.g., the front end point) of the probe and the supporting point of the measuring arm or a distance between a predetermined point (e.g., the point for the probe attachment) of the head member and the supporting point may be used as well.

A position of the supporting point of the measuring arm, which is a starting point of the above-described distance, may be a position of the shoulder joint, a position where the second end is attached to the support member, a position of the support member, or any position among these positions, depending on the structure of the measuring system.

The processor can determine the above-described distance, for example, by determining a position of the wrist joint or the like, and by calculating a distance between the determined position and the previously known position of the supporting point of the measuring arm.

Therefore, systems and methods consistent with the present invention may also provide an warning unit configured to warn a user in response to a detection of at least one of first and second conditions, where the first condition is that an angle between the first and second links exceeds a first value and the second condition is that a distance from a supporting point of the measuring arm to a head point of the measuring arm exceeds a second value. The first value may be an angle slightly smaller than 180 degrees that has been determined irrespective of the end stop of the joint between the first and second links.

From another aspect, systems and methods consistent with the present invention may comprise detecting a parameter concerning a posture of the measuring arm exceeding a prescribed value, where the prescribed value has been determined in accordance with a probability that a measurement error due to a user action pulling the measuring arm away from the support member becomes out of an allowable range, and warning a user in accordance with a result of the detecting.

With the above-mentioned arrangement, the measurement system can detect whether its measuring arm is in a posture with a stress that causes an unallowable measurement error, and can warn a user.

A multi-joint coordinate measuring system consistent with the present invention may further comprise a balancer, provided in association with the shoulder joint, for generating a force raising the second link on a side of the elbow joint against gravity.

In measuring systems comprising such a balancer, the force of the balancer becomes minimum when the measuring arm is standing straight up and becomes maximum as the measuring arm rotates downward around the shoulder joint, for example. On the other hand, calibration after assembly of the measuring arm is performed at a point where the force of the balancer matches a certain value, for example, a point where the force generated by the balancer balances with a force of gravity of the measuring arm. Therefore, when a user tries to make a measurement bending the measuring arm out of a certain range that approximately centers around the balance point, the measurement error may become large and out of an allowable range.

Additional or second systems and methods consistent with the present invention warn a user according to a parameter concerning a posture of the measuring arm before the user measures in a condition that the measurement error is out of an allowable range due to such a difference in the force of the balancer. The warned user can bring the arm back to a posture of maintaining good measurement accuracy and continue measurement. Therefore, sufficiently accurate coordinate measurement can be realized.

The parameter of the second systems and methods is set to give a warning, for example, when an angle of the shoulder joint exceeds or approaches an angle limit (e.g., ±80 degrees where the horizontal direction is 0 degree) that assures desired measurement accuracy. In this example, a state where the second link is horizontal or almost horizontal is the point where the force of the balancer matches a certain value as described above. The parameter is selected because the force of the balancer becomes too weak when the second link rotates upward about the shoulder joint to be nearly perpendicular, and because the force of the balancer becomes too strong when the second link rotates downward about the shoulder joint to be nearly perpendicular.

The point where the force of the balancer matches the certain value does not have to be a point where the force balances with gravity of the measuring arm. Any other state may be used as well. In addition, if measurement accuracy is within an allowable range in the direction where the force of the balancer increases, a warning may be given only in the direction where the force of the balancer decreases. For instance, in the above example, a warning will be given only when the second link rotates upward by 80 degrees or more from the horizontal direction. Conversely, a warning may be given only in the direction where the force of the balancer increases, such as when the second link rotates downward by 80 degrees or more from the horizontal direction. It is also acceptable that different limit angles (e.g., +80 degrees and −70 degrees from the horizontal direction) are set for upward and downward directions respectively.

Therefore, second systems and methods consistent with the present invention provide an warning unit for warning a user in response to a detection of a third condition, where the third condition is that the shoulder joint provides the second link with a bending motion beyond a range determined based on the force generated by the balancer. The warning unit can be implemented using, for example, blinking lights, a speaker making an audible noise, a CRT display, or combination thereof.

From another aspect, second systems and methods consistent with the present invention comprise detecting a parameter concerning a posture of the measuring arm exceeding a prescribed value, where the prescribed value has been determined in accordance with a probability that a measurement error due to a user action moving the measuring arm with a change in the force applied to the measuring arm by the balancer becomes out of an allowable range, and warning a user in accordance with a result of the detecting.

The second systems and methods may be combined with the systems and methods described first. For example, such systems and methods may comprise an warning unit configured to warn a user in response to a detection of at least one of first, second, and third conditions, where the first condition is that an angle between the first and second links exceeds a first value, the second condition is that a distance from a supporting point of the measuring arm to a head point of the measuring arm exceeds a second value, and the third condition is that the shoulder joint provides the second link with a bending motion beyond a range determined based on the force generated by the balancer.

Either of the first and second systems and methods may further control the processor not to output the three-dimensional coordinate in addition to warning to a user. It can prevent a user from using a three-dimensional coordinate with poor measurement accuracy. In order to control the processor not to output the three-dimensional coordinate, input of each joint's angle data to the processor may be prevented from being provided to a calculation of the three-dimensional coordinate. Alternatively or additionally, the three-dimensional coordinate produced by the processor may be prevented from being outputted.

In a case of controlling the processor not to output the three-dimensional coordinate in addition to warning a user, the warning can be started in response to a condition that each observed parameter approaches a prescribed value that is slightly below a limit value that assures desired measurement accuracy. In this way, the control not to output the three-dimensional coordinate will be performed when the user ignores the warning and continues moving the measuring arm and the parameter thus exceeds the limit value.

Third systems and methods consistent with the present invention produce the three-dimensional coordinate by using a formula including a term for correcting an error due to a change of the force generated by the balancer, where the force varies depending on an angle of the shoulder joint. For example, the formula includes a parameter representing a deflection of the second link due to the force generated by the balancer, and this parameter is determined based on an angle of the shoulder joint.

Third systems and methods consistent with the present invention can offer sufficiently accurate three-dimensional coordinate output because the processor calculates the three-dimensional coordinate while compensating for a measurement error due to the change of the balancer's force according to a posture of the measuring arm.

Second systems and methods consistent with the present invention prevent a measurement error due to an influence of the balancer's force by warning a user, whereas third systems and methods consistent with the present invention correct a measurement error by approximately removing the influence of the balancer's strength using software in the processor. Therefore, the third systems and methods can be embodied as an alternative to the second systems and methods, and can also be embodied in combination with the second systems and methods (e.g., a system that warns a user when the second link is bent beyond a point where a measurement error cannot be removed even with the correction by software).

FIG. 1 is an external view showing an example of a multi-joint coordinate measuring system. A measuring arm is composed of a head member 2 for holding a probe 1, a first link 5, a second link 8, and six joints. The sixth joint is attached to a pillar that supports the measuring arm, providing a rotation between the measuring arm and the pillar.

A No. 1 joint (wrist joint) 3 provides a bending motion between the first link 5 and the head member 2 (rotation about the A axis of FIG. 2); a No. 2 joint 4 provides a twisting motion between the first link 5 and the head member 2 (rotation about the B axis of FIG. 2); a No. 3 joint (elbow joint) 6 provides a bending motion between the second link 8 and the first link 5 (rotation about the C axis of FIG. 2); a No. 4 joint 7 provides a twisting motion between the second link 8 and the first link 5 (rotation about the D axis of FIG. 2); a No. 5 joint (shoulder joint) 9 provides a bending motion between the pillar 11 and the second link 8 (rotation about the E axis of FIG. 2); and a No. 6 joint 10 provides a twisting motion between the pillar 11 and the second link 8 (rotation about the F axis of FIG. 2). Each of the joints from No. 1 through No. 6 incorporates a rotary encoder or other angle sensor to detect each rotation angle about its axis. One or more of the No. 2, No. 4, and No. 6 joints may have an end stop that limits rotation for the twisting motion, or alternatively may rotate endlessly.

The pillar 11 is mounted on a portable base 12, which can be equipped with a dedicated processor 13 and a computer 14. The rotary encoders of the joints are connected to the dedicated processor 13 by wire or wireless, and the output from each rotary encoder is inputted to the dedicated processor 13. The dedicated processor 13 produces an (X, Y, Z) coordinate of the probe 1 based on the inputted angles of the joints and static positional relationships among each members (including lengths of the links and probe). The computer 14 starts and executes various application programs to which three-dimensional coordinates produced by the dedicated processor 13 are inputted.

Figure 3:
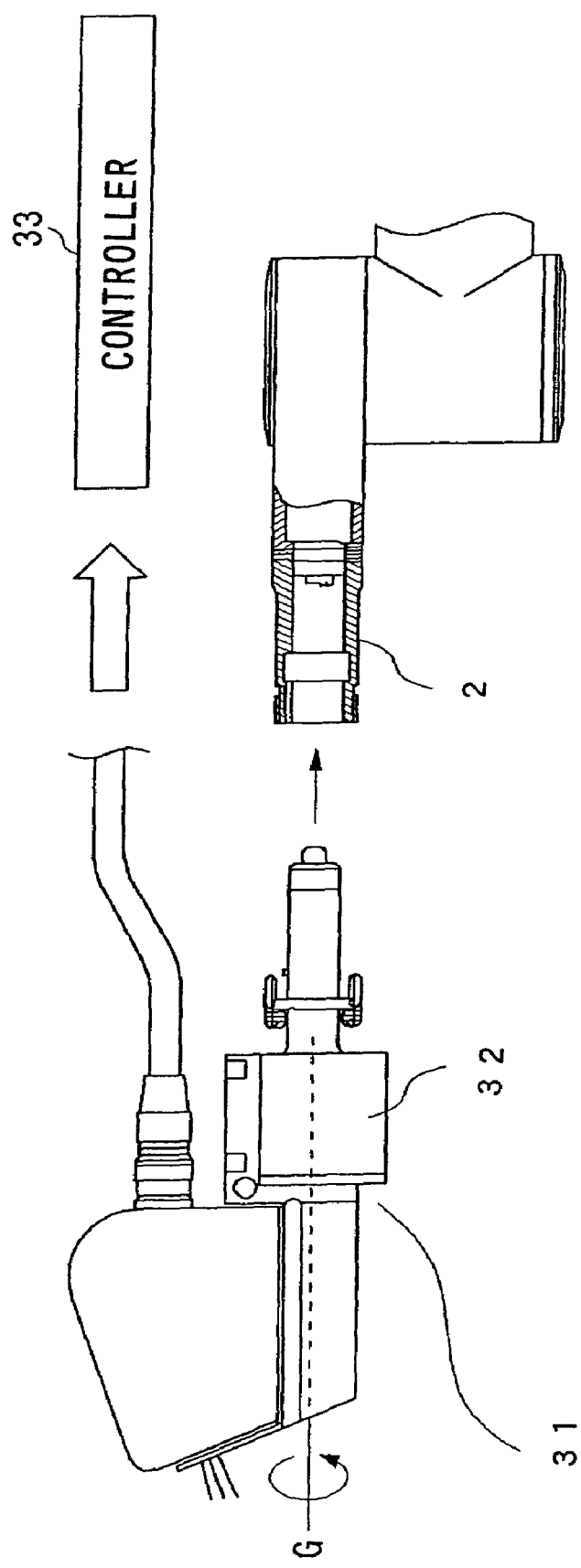
FIG. 3 shows another exemplary probe that can be installed in the measuring arm shown in FIG. 1.

Various probes may be attached to the head member 2 of the above measuring arm. The probe 1 of FIG. 1, by touching with its tip the surface of an object to be measured, determines a coordinate of the contact point. This probe may be replaced, for example, by a noncontact probe such as the one shown in FIG. 3. In the example of FIG. 3, a probe joint 32, which provides rotation about the G axis, incorporates a noncontact laser probe 31 and is attached to the head member 2. To locate the position of a sensor section of the noncontact probe 31, a rotary encoder is also embedded in the probe joint 32. In this case, the dedicated processor 13 produces a three-dimensional coordinate of the probe based on angles of the No. 1 though No. 6 joints and probe joint. A sensing result obtained by the laser of the noncontact probe 31, separately from angles of each joint, is inputted into a noncontact probe controller 33. The sensing result is processed there and combined with the coordinate of the probe determined by the dedicated processor 13, and thus generates data concerning the surface of the object to be measured.

Figure 4:
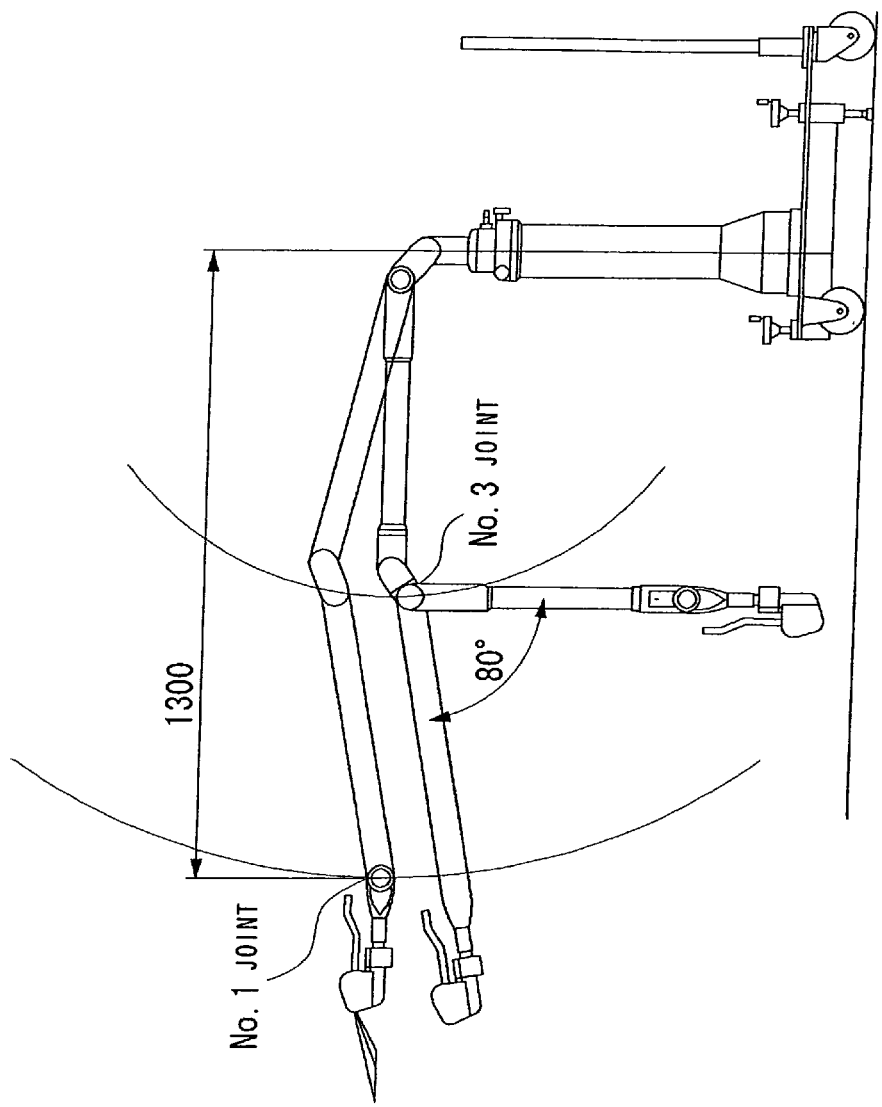
FIG. 4 shows exemplary parameters to specify a posture in which a measurement error becomes large and out of an allowable range when a user pulls the measuring arm and tries to measure a far point.
Figure 5:
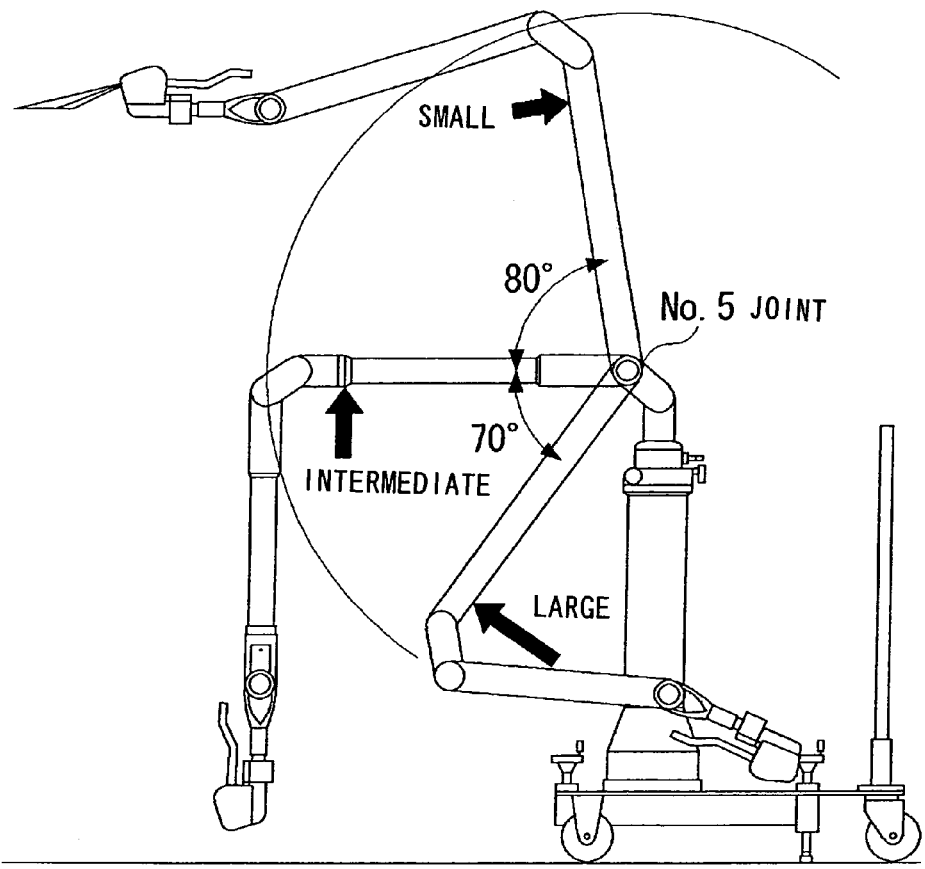
FIG. 5 shows an exemplary parameter to specify a posture in which a measurement error becomes large and out of an allowable range due to the influence of the balancer whose force varies depending on a posture of the measuring arm.

While a user moves the measuring arm having such a structure and measures a position coordinate of an object to be measured, the system warns the user if a posture of the measuring arm becomes similar to postures exemplified in FIGS. 4 and 5, so that measurement accuracy will not worsen beyond an allowable range. Although FIGS. 4 and 5 show examples using the probe 31 of FIG. 3, similar control is performed when the probe 1 of FIG. 1 is used. A coordinate of a probe calculated in the dedicated processor can represent a position of a laser in the case of FIG. 3 probe, and a position of a tip in the case of FIG. 1 probe.

FIG. 4 shows an example of parameters to specify a posture in which a measurement error becomes large and out of an allowable range when a user pulls the measuring arm and tries to measure a far point.

One parameter is an angle of the No. 3 joint (elbow joint) 6. In this example, the angle sensor of the No. 3 joint 6 is set to indicate 0 degree when the first link 5 and the second link 8 form a right angle. When the angle sensor of the No. 3 joint 6 exceeds 80 degrees, the first link 5 becomes nearly parallel to the second link 8, and it is determined that the measurement error becomes large and out of an allowable range. Therefore, in this case, 80 degrees (170 degrees when expressed as a relative angle between the first link 5 and the second link 8) is a specific posture limit.

Another possible parameter is a distance between the center of the No. 1 joint (wrist joint) and a supporting point of the measuring arm. The center of the No. 6 joint 10 attached to the pillar 11, for example, may be used as the supporting point of the measuring arm. The maximum distance to the No. 1 joint 3 of the measuring arm of FIG. 4 is 1350 mm. If the distance from the supporting point of the arm to the No. 1 joint 3 exceeds 1300 mm, it is determined that the measurement error becomes large and out of an allowable range. Therefore, in this case, 1300 mm is a specific posture limit.

In one embodiment, if either of the above two parameters approaches to a corresponding specific posture limit, the measuring system warns a user by sounding an alarm, blinking a light, or the like. For example, the system warns a user when an angle of the No. 3 joint 6 exceeds 78 degrees or when the distance to the No. 1 joint 3 exceeds 1270 mm. After that, when the angle of the No. 3 joint 6 exceeds 80 degrees or when the distance to the No. 1 joint 3 exceeds 1300 mm, at least one of the following two processes of the dedicated processor 13 is stopped: 1) acquiring a signal from angle sensors of each joint; and 2) outputting a three-dimensional coordinate. At the same time, continuing to warn the user, the system may change the quality or volume of the alarm sound, lighting pattern, display indication, or the like, or may adopt another method of letting the user recognize that the output of the three-dimensional coordinate is stopped.

As shown in FIGS. 1 and 2, the head member 2 of the measuring arm of this example rotates 360 degrees or endlessly about the axis A, so a user tends to grip the No. 1 joint 3 when moving the measuring arm to near an object to be measured. Therefore, for the measuring arm of this example, the distance from the No. 1 joint 3 to the supporting point of the arm is used as a parameter to specify the posture, instead of a distance from a position of the head member 2 or from the front end of the probe 1.

FIG. 5 shows how a force generated by the balancer of the measuring arm varies depending on a posture of the measuring arm. It also shows an example of a parameter to specify a posture in which a measurement error becomes large and out of an allowable range due to the influence of the balancer.

Various known structures may be used for a balancer, which is commonly called a counter balance. For example, there may be a structure of combining a spring assembly as shown in U.S. Pat. No. 4,659,280 (hereby incorporated by reference) with the No. 5 joint 9 of FIG. 1, or a structure of incorporating a torsion coil spring into the No. 5 joint 9. U.S. Pat. No. 5,189,797 (hereby incorporated by reference) shows another structure in which a link support member is provided parallel to the second link and a spring is provided adjacent to a joint like the No. 5 joint 9. In this structure, the force of the spring is transferred through the link support member to the second link.

With a balancer of any form, in the case of the measuring arm of this example, the force of the balancer decreases when the second link 8 is rotated upward about the No. 5 joint 9, and conversely it increases when the second link 8 is rotated downward, as shown in FIG. 5. In this example, in a neutral state where user's hands are off the measuring arm, the second link 8 is almost horizontal and the first link 5 is hanging down perpendicular to the ground. In this state, gravity of the measuring arm balances with the force of the balancer raising the measuring arm. Calibration or other various adjustments, after assembly of the measuring arm, are typically performed to achieve the best measurement accuracy around this balanced state.

In this example, the influence of strength of the balancer's force may cause a measurement error to become out of an allowable range. Therefore, as shown in FIG. 5, a value of +80 degrees of the No. 5 joint 9's angle sensor is set as a specific posture limit beyond which the force of the balancer becomes too weak and the measurement error becomes out of an allowable range. Here, the angle sensor of the No. 5 joint 9 in this example is set to indicate 0 degree when the second link 8 is parallel to the ground. So the specific posture limit is 170 degrees when expressed as a relative angle between the pillar 11 and the second link 8. As is the case with the example of FIG. 4, the system warns a user when the arm approaches to the specific posture limit (e.g., when the angle sensor of the No. 5 joint 9 becomes 78 degrees or more), and stops data acquisition from the angle sensor and/or output of a three-dimensional coordinate when the arm exceeds the specific posture limit (e.g., when the angle sensor of the No. 5 joint 9 goes over 80 degrees).

A specific posture limit can also be set for a state where the force of the balancer becomes too strong (e.g. a value of −70 degrees of the No. 5 joint 9's angle sensor for the example of FIG. 5). However, since it is difficult to push down the measuring arm of this example to such a state, a user warning function for the lower limit can be omitted if it is assumed that a user would not move the arm down under the lower specific posture limit.

Figure 6:
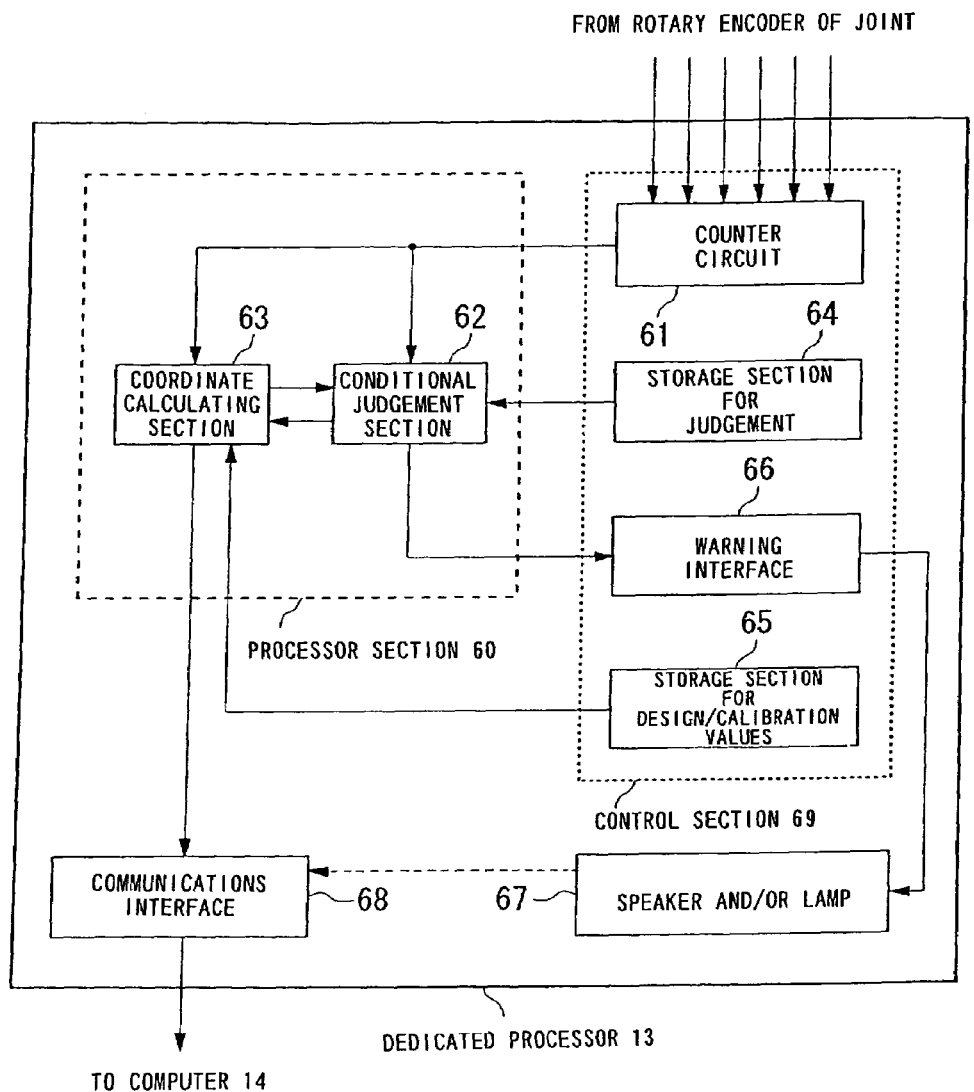
FIG. 6 shows an example of an internal configuration of the dedicated processor shown in FIG. 1.

FIG. 6 shows an example of an internal configuration, of the dedicated processor 13, for controlling measurement based on specific posture limits explained in FIGS. 4 and 5. Outputs from the rotary encoders of the joints No. 1 though No. 6 are inputted into a counter circuit 61 and become a signal to indicate angles of the joints. A processor section 60 of the dedicated processor 13 includes a conditional judgment section 62 and a coordinate calculating section 63, which are described below.

The coordinate calculating section 63 reads from a storage section 65 a design value which defines static positional relationships among each members of the measuring arm and a deviation from the design value (calibration value) determined after assembly of the measuring arm. The section 63 then, by substituting into a kinematic formula these values and angles of each joint inputted from the counter circuit 61, calculates an (X, Y, Z) coordinate of the probe. Those skilled in the art will be familiar with such kinematic formulas suitable for calculating the probe's coordinates based on such input values and angles, such as those described hereafter with regard to FIGS. 8 and 9. The produced coordinate is sent to an application program of the computer 14 via a communications interface 68.

The conditional judgment section 62 carries out the processes described below, which are explained using the examples of FIGS. 4 and 5. The first process is to compare an angle of the No. 3 joint inputted from the counter circuit 61 with values stored in a storage section for set values for conditional judgment 64 (78 degrees and 80 degrees for the example of FIG. 4). The conditional judgment section 62 then warns a user by sending a signal to a warning indicator, such as a speaker and/or lamp 67 and/or user display on computer 14, via a warning interface 66 if the angle of the No. 3 joint exceeds 78 degrees, and stops the three-dimensional coordinate output from the coordinate calculating section 63 if the angle exceeds 80 degrees.

The second process is as follows: the coordinate calculating section 63 acquires angles of each joint outputted from the counter circuit 61 and locates by calculation a position of the No. 1 joint; a distance from the No. 1 joint to the supporting point of the arm is calculated based on the location; and the calculated result is compared with values stored in the storage section for set values for conditional judgment 64 (1270 mm and 1300 mm for the example of FIG. 4). The conditional judgment section 62 then warns a user by sending a signal to a warning indicator, such as a speaker and/or lamp 67 and/or user display on computer 14, via the warning interface 66 if the calculated distance exceeds 1270 mm, and stops the three-dimensional coordinate output from the coordinate calculating section 63 if the distance exceeds 1300 mm.

The third process is to compare an angle of the No. 5 joint inputted from the counter circuit 61 with values stored in the storage section for set values for conditional judgment 64 (78 degrees and 80 degrees for the example of FIG. 5). The conditional judgment section 62 then warns a user by sending a signal to a warning indicator, such as a speaker and/or lamp 67 and/or user display on computer 14, via a warning interface 66 if the angle of the No. 5 joint exceeds 78 degrees, and stops the three-dimensional coordinate output from the coordinate calculating section 63 if the angle exceeds 80 degrees.

By stopping the three-dimensional coordinate output from the coordinate calculating section 63 as described above, the processor section 60 or the dedicated processor 13 is controlled not to output the three-dimensional coordinate. Set values for conditional judgment stored in the storage section 64 and design values and calibration values of the measuring arm stored in the storage section 65 can be incorporated into the dedicated processor 13 as a form of ROM, RAM, or other storage media. The counter circuit 61, the warning interface 66, and the storage sections 64 and 65 may constitute a control section 69.

Here, the conditional judgment section 62 and the coordinate calculating section 63 are described as the processor section 60. In one example, separate processors can be used for the two sections. In another example, a single processor can be used such that it operates according to a program written for the process of the conditional judgment section 62 at one point in time, and operates according to a program written for the process of the coordinate calculating section 63 at another point in time.

Bending motions of the No. 3 joint and No. 5 joint have their respective rotation angle limits due to the structure of the measuring arm. However, regardless of the physical rotation limits, a user is warned and the three-dimensional coordinate output is stopped at the above-described specific posture limits.

For measuring systems manufactured to an identical design, a specific posture limit exemplified in FIGS. 4 and 5 can be set as an identical value. A specific posture limit can also be determined for each measuring system according to its inspection data. The latter case is more effective in maintaining an arm posture that produces accurate measurement results stably because an inherent error factor of each measuring system can be involved in specifying an arm posture that lowers measurement accuracy.

Figure 7A:
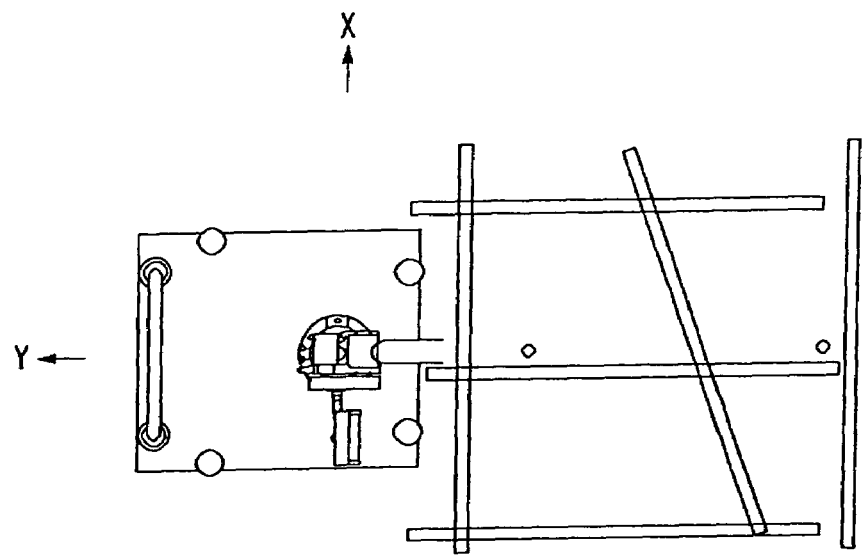
FIGS. 7A and 7B show an example of an inspection method for determining parameters, shown in FIGS. 4 and 5, of each measuring system individually.
Figure 7B:
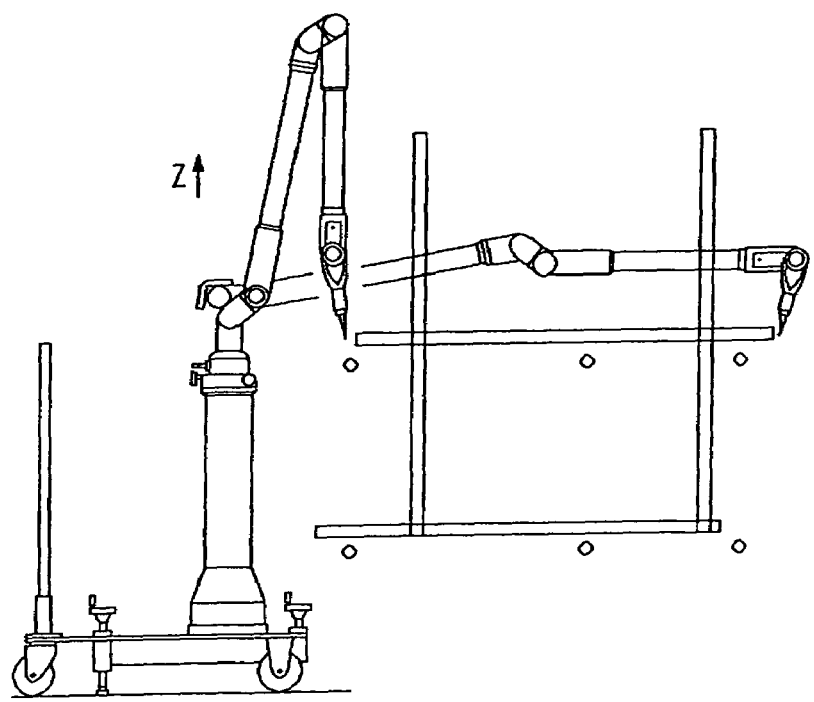

FIGS. 7A and 7B show an example of a method for getting inspection data from each measuring system. In this example, one-meter gage blocks, for example, are placed in various places around in front of the measuring system. Then, each block is measured to find an angle of the No. 3 joint, a position of the No. 1 joint's reach, and an angle of the No. 5 joint for a posture in which the measurement error is larger than a specified value. Thus, limit values of each parameter may be determined. FIG. 7A is a view of the gage blocks' arrangement when looked at from right above the measuring system, and FIG. 7B is a view of the gage blocks' arrangement when looked at from right beside the measuring system. In addition to the above-described example, a measurement result obtained by placing special gauges in various places can be used in determining limit values for each parameter.

The following is an explanation of the operation of the coordinate calculating section 63 and the accompanying storage section 65 of FIG. 6 in the case that the influence of the balancer's strength is approximately removed by correction software.

An exemplary kinematic formula used by the coordinate calculating section 63 to give a three-dimensional coordinate of a point P of a probe of a six-joint three-dimensional coordinate measuring system includes a transformation matrix composed of six or more 4×4 (four rows and four columns) matrices concatenated to each other. For explanation, a portion of the second link section under the influence of the balancer's force is described below in a simplified form.

Figure 8:
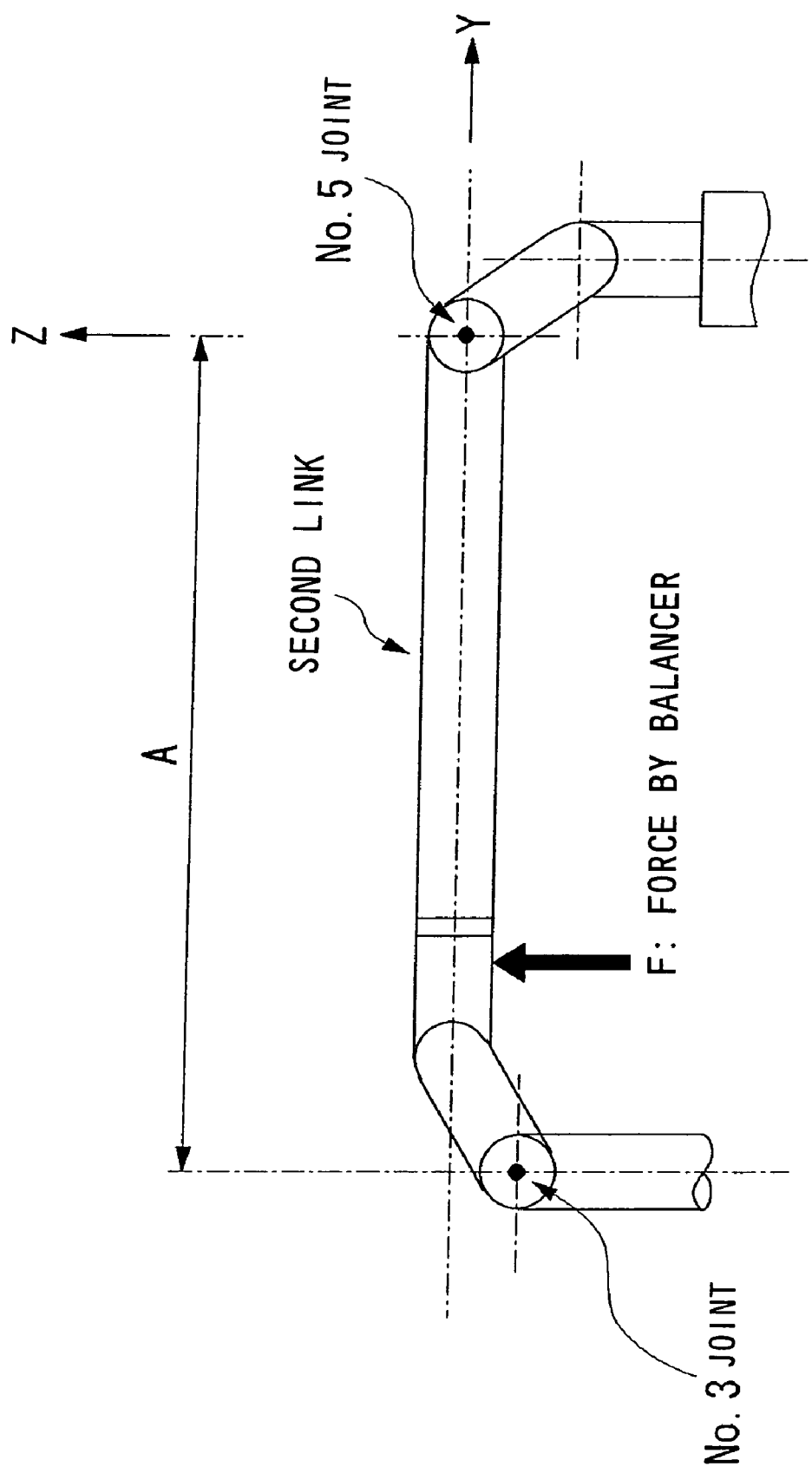
FIG. 8 shows an exemplary model to explain a kinematic formula for the second link section of the measuring arm shown in FIG. 1.

Regarding a model shown in FIG. 8 (a model in which the influence of the force of the balancer can be ignored), in a "second link mechanism" coordinate system with the No. 4 joint section ignored, Equation (1) below is a kinematic formula of a 4×4 transformation matrix which transforms a three-dimensional coordinate of the point P of the probe seen from the No. 3 joint section to a three-dimensional coordinate P(x, y, z) of the point P of the probe seen from the No. 5 joint section.

$$P(x, y, z) = (x, y, z, 1) \begin{pmatrix} 1 & 0 & 0 & 0 \\ 0 & 1 & 0 & 0 \\ 0 & 0 & 1 & 0 \\ 0 & -A & 0 & 1 \end{pmatrix} \begin{pmatrix} 1 & 0 & 0 & 0 \\ 0 & \cos Y & -\sin Y & 0 \\ 0 & \sin Y & \cos Y & 0 \\ 0 & 0 & 0 & 1 \end{pmatrix} \quad (1)$$

In Equation (1), A is a length of the second link and Y is an angle of the No. 5 joint. Since Equation (1) does not include a term for correcting the influence of the balancer's strength, P(x, y, z) calculated by Equation (1) is supposed to have a dynamic measurement error incident to a change of the balancer's force.

In contrast to this, methods and systems consistent with the invention can use another kinematic formula that considers the fact that a dynamic deflection occurs due to the strength of a balancer force F when the second link shown in FIG. 5 is rotated about the No. 5 joint. The coordinate calculating section 63 in this case uses, for example, Equation (2) below as the kinematic formula of a 4×4 transformation matrix that transforms a three-dimensional coordinate of the point P of the probe seen from the No. 3 joint section to a corrected three-dimensional coordinate P0(x, y, z) of the point P of the probe seen from the No. 5 joint section. This Equation (2) is derived from modeling the above-described deflection as shown in FIG. 9.

$$P0(x, y, z) = (x, y, z, 1) \begin{pmatrix} 1 & 0 & 0 & 0 \\ 0 & 1 & 0 & 0 \\ 0 & 0 & 1 & 0 \\ 0 & -B & 0 & 1 \end{pmatrix} \quad (2)$$

$$\begin{pmatrix} 1 & 0 & 0 & 0 \\ 0 & \cos X & -\sin X & 0 \\ 0 & \sin X & \cos X & 0 \\ 0 & -C & 0 & 1 \end{pmatrix} \begin{pmatrix} 1 & 0 & 0 & 0 \\ 0 & \cos Y & -\sin Y & 0 \\ 0 & \sin Y & \cos Y & 0 \\ 0 & 0 & 0 & 1 \end{pmatrix}$$

Figure 9:
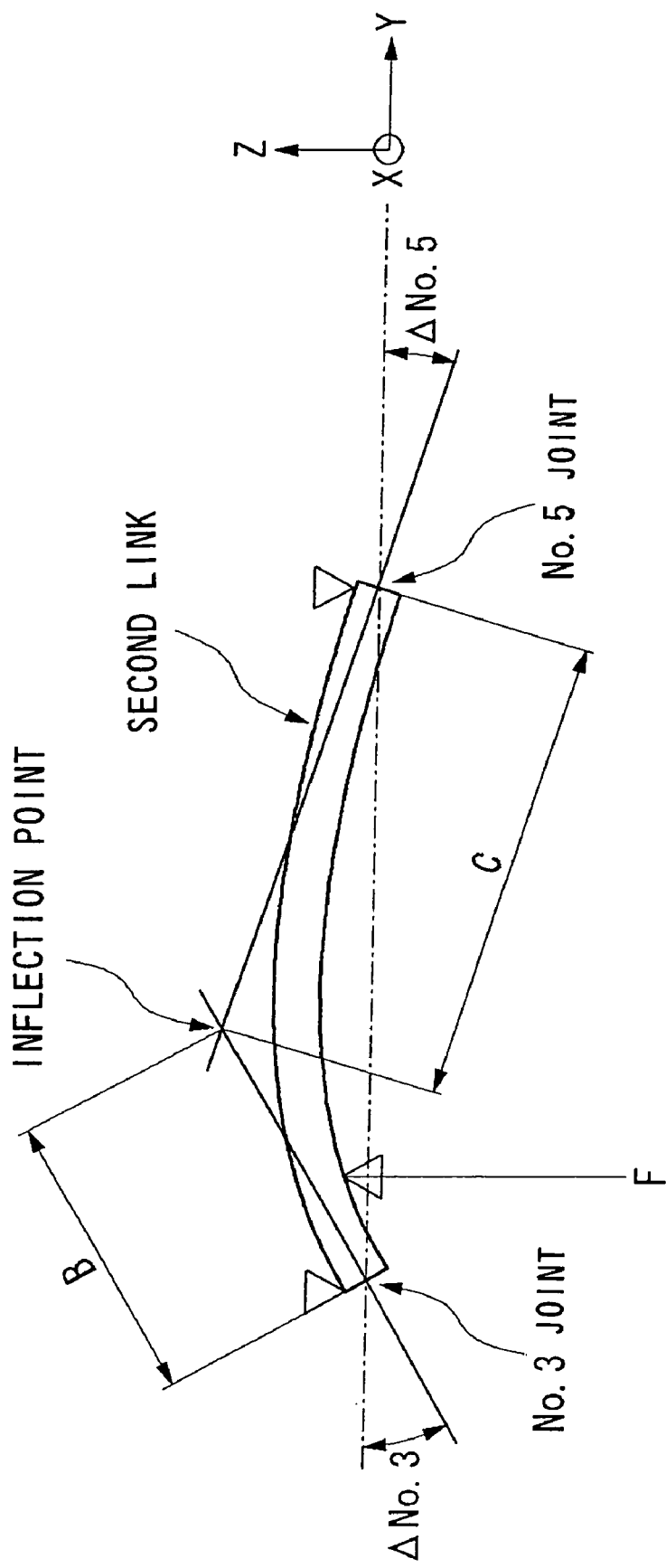
FIG. 9 illustrates a basic form of a deflection that occurs at the second link section shown in FIG. 8.

In Equation (2), B, as shown in FIG. 9, is a distance between the center of the No. 3 joint and an inflection point due to the deflection, and C is a distance between the center of the No. 5 joint and the inflection point due to the deflection, assuming that B plus C is approximately A (the length of the second link). Y is an angle of the No. 5 joint, and X is an error angle ΔNo. 3 of the No. 3 joint section due to the deflection. The detected angle Y of the No. 5 joint includes an error angle ΔNo. 5 of the No. 5 joint section due to the deflection.

As a term for correcting the influence of the balancer's strength, Equation (2) includes an approximate correction for a case there is one inflection point due to the deflection. That is, Equation (2) includes sinX, cosX, B, and C as terms that change due to the strength of the balancer force. Alternatively, B and C can be treated as fixed values. X reflects a change due to the balancer's strength and takes on different values according to the angle Y of the No. 5 joint (X becomes larger as the balancer's force increases, and X becomes smaller as the balancer's force decreases).

Therefore, by calculating the correction value X approximately interpolated using, for example, correction constants set at every prescribed angle of the No. 5 joint, and by substituting this X into Equation (2), P0(x, y, z) calculated by Equation (2) will be approximately free of a dynamic measurement error incident to a change of the balancer's force. Correction constants to be used here may be stored in the storage section 65 as a calibration file. Values of such constants may be changed according to the circumstances. In an alternative method, values of the constants can be calculated in real time during an actual measurement according to a sensor's detection of the balancer's force.

The above example shows a correction in the YZ plane of the second link (the correction influences Y and Z coordinates). A dynamic measurement error can also be approximately removed from an X coordinate by a similar correction. Since the second link under the force of the balancer moves with its joints No. 4, No. 5 and No. 6 rotating in conjunction with each other, the three-dimensional coordinate P0 can be calculated more accurately by correcting the X coordinate as well as the Y and Z coordinates.

The above example shows a model having a single inflection point. In a case there are more than one inflection point due to the structure of the arm, a transformation matrix can be developed in a similar manner. Furthermore, an error due to a twisting motion can be corrected as well by developing a transformation matrix similarly.

An example to transform a three-dimensional coordinate (x, y, z) seen from the No. 3 joint section to a three-dimensional coordinate seen from the No. 5 joint section is described above. The inverse transformation of this example can also be performed.

In addition, when a link mechanism or joint section other than the ones shown in FIG. 9 are influenced by the balancer's strength, an extensive correction can be made by analyzing which axis is influenced and whether it is a rotary motion or parallel motion and by taking the result in the above-illustrated kinematic formula.

Persons of ordinary skill in the art will realize that many modifications and variations of the above embodiments may be made without departing from the novel and advantageous features of the present invention. For example, methods and systems consistent with the present invention can also be applied to a multi-joint measuring system having a structure other than the one of FIG. 1. In a basic posture of the measuring arm of FIG. 1, the second link is supported horizontally on the perpendicular pillar from which the first link hangs down. Methods and systems consistent with the present invention can be applied to a system that has a support base instead of the pillar and to a system whose second link is perpendicular in its basic posture.

Accordingly, all such modifications and variations are intended to be included within the scope of the appended claims. The specification and examples are only exemplary. The following claims define the true scope and spirit of the invention.

What is claimed is:

1. A multi-joint coordinate measuring system comprising:
a support member;
a multi-joint measuring arm having a first end for installation of a probe and a second end for attachment to the support member, the arm including:
  a head member for holding the probe;
  a first link;
  a second link;
  a wrist joint for providing a bending motion between the head member and the first link;
  an elbow joint for providing a bending motion between the first link and the second link; and
  a shoulder joint for providing a bending motion between the second link and the support member;
a processor configured to produce a three-dimensional coordinate corresponding to a position of the probe based on an angle of each joint of the measuring arm; and
a warning indicator that warns a user in response to a determination of an angle between the first and second links, a determination of a distance from a supporting point of the measuring arm to a head point of the measuring arm, and a detection of at least one of first and second conditions, the first condition being that the determined angle between the first and second links exceeds a first value and the second condition being that the determined distance from the supporting point of the measuring arm to the head point of the measuring arm exceeds a second value.

2. The system according to claim 1, wherein
the processor is further operative to detect the first condition based on an angle of the elbow joint.

3. The system according to claim 1, wherein
the processor is further operative to detect the second condition using, as the supporting point of the measuring arm, a point determined based on at least one of a position of the shoulder joint, a position of the second end, and a position of the support member.

4. The system according to claim 1, wherein
the processor is further operative to detect the second condition using, as the head point of the measuring arm, a point determined based on at least one of a position of the wrist joint, a position of the head member, and the position of the probe.

5. The system according to claim 1, wherein
the processor is further operative to detect the second condition by determining a position of the wrist, calculating a distance between the determined position and the supporting point, and comparing the calculated distance with the second value.

6. The system according to claim 1, further comprising
a counter balance, provided in association with the shoulder joint, for generating a force raising the second link on a side of the elbow joint against gravity,
and wherein
the warning indicator warns a user in response to a detection of at least one of the first and second conditions and a third condition, the third condition being that the shoulder joint provides the second link with a bending motion beyond a range determined based on the force generated by the counter balance.

7. The system according to claim 1, further comprising
a counter balance, provided in association with the shoulder joint, for generating a force raising the second link on a side of the elbow joint against gravity,
and wherein
the processor uses, to produce the three-dimensional coordinate, a formula including a term for correcting an error due to a change of the force generated by the counter balance, the force varying depending on an angle of the shoulder joint.

8. The system according to claim 1, wherein
the processor is controlled not to output the three-dimensional coordinate after the detection.

9. The system according to claim 1, wherein the measuring arm further includes:
a first joint for providing a twisting motion between the head member and the first link;
a second joint for providing a twisting motion between the first link and the second link; and
a third joint for providing a twisting motion between the second link and the support member.

10. A multi-joint coordinate measuring system comprising:
a support member;
a multi-joint measuring arm having a first end for installation of a probe and a second end for attachment to the support member, the arm including:
  a head member for holding the probe;
  a first link;
  a second link;

a wrist joint for providing a bending motion between the head member and the first link;

an elbow joint for providing a bending motion between the first link and the second link; and a shoulder joint for providing a bending motion between the second link and the support member;

a processor configured to produce a three-dimensional coordinate corresponding to a position of the probe based on an angle of each joint of the measuring arm;

a counter balance, provided in association with the shoulder joint, for generating a force raising the second link on a side of the elbow joint against gravity; and a warning indicator that warns a user in response to a detection of a condition that the shoulder joint provides the second link with a bending motion beyond a range determined based on the force generated by the counter balance.

11. The system according to claim 10, wherein
the processor is controlled not to output the three-dimensional coordinate after the detection.

12. The system according to claim 10, wherein the measuring arm further includes:

a first joint for providing a twisting motion between the head member and the first link;

a second joint for providing a twisting motion between the first link and the second link; and a third joint for providing a twisting motion between the second link and the support member.

13. A method of controlling measurement by a multi-joint coordinate measuring system, the system including a support member, a multi-joint measuring arm having a first end attached to the support member and a second end, a probe installed at the second end of the measuring arm, and a processor capable of producing a three-dimensional coordinate corresponding to a position of the probe based on an angle of each joint of the measuring arm, the method comprising:

storing a prescribed value concerning a posture of the measuring arm, the prescribed value having been determined such that a measurement error due to a user action pulling the measuring arm away from the support member would become within an allowable range;

determining a parameter concerning the posture of the measuring arm;

detecting the determined parameter exceeding the stored prescribed value; and warning a user in accordance with a result of the detecting.

14. The method of claim 13, wherein
a first parameter concerning an angle between links of the measuring arm and a second parameter concerning a distance of the measuring arm's reach are used in the detecting, and the warning is performed when at least one of the first and second parameters exceeds a corresponding prescribed value.

15. The method of claim 13, further comprising
controlling the processor not to output the three-dimensional coordinate in accordance with a result of the detecting.

16. The method of claim 13, further comprising:
additionally detecting the parameter concerning the posture of the measuring arm exceeding a limit value, the limit value being larger than the prescribed value; and
controlling the processor not to output the three-dimensional coordinate in accordance with a result of the additional detecting.

17. The method of claim 13, wherein
the parameter concerning the posture of the measuring arm includes a parameter concerning an angle between links of the measuring arm.

18. The method of claim 13, wherein
the parameter concerning the posture of the measuring arm includes a parameter concerning a distance of the measuring arm's reach.

19. A method of controlling measurement by a multi-joint coordinate measuring system, the system including a support member, a multi-joint measuring arm having a first end attached to the support member and a second end, a probe installed at the second end of the measuring arm, a processor capable of producing a three-dimensional coordinate corresponding to a position of the probe based on an angle of each joint of the measuring arm, and a counter balance configured to generate a force raising the measuring arm against gravity, the method comprising:

storing a prescribed value concerning a posture of the measuring arm, the prescribed value having been determined such that a measurement error due to a user action moving the measuring arm with a chance in the force applied to the measuring arm by the counter balance would become within an allowable range;

determining a parameter concerning the posture of the measuring arm;

detecting the determined parameter exceeding the stored prescribed value; and warning a user in accordance with a result of the detecting.

20. The method of claim 19, further comprising
controlling the processor not to output the three-dimensional coordinate in accordance with a result of the detecting.

21. The method of claim 19, further comprising:
additionally detecting the parameter concerning the posture of the measuring arm exceeding a limit value, the limit value being larger than the prescribed value; and
controlling the processor not to output the three-dimensional coordinate in accordance with a result of the additional detecting.

22. The method of claim 19, wherein
the parameter concerning the posture of the measuring arm includes a parameter concerning an angle of a joint of the measuring arm.

23. A multi-joint coordinate measuring system comprising:
a support member;
a multi-joint measuring arm having a first end for installation of a probe and a second end for attachment to the support member, the arm including:
a head member for holding the probe;
a first link;
a second link;
a wrist joint for providing a bending motion between the head member and the first link;
an elbow joint for providing a bending motion between the first link and the second link; and
a shoulder joint for providing a bending motion between the second link and the support member;
a counter balance, provided in association with the shoulder joint, for generating a force raising the second link on a side of the elbow joint against gravity; and
a processor configured to input an angle of each joint of the measuring arm into a formula to produce a three-dimensional coordinate corresponding to a position of the probe, the formula including a term for correcting an error due to a change of the force generated by the counter balance.

24. The system according to claim 23, wherein the formula includes, in association with the term, a parameter representing a deflection of the second link due to the force generated by the counter balance, the parameter being determined based on an angle of the shoulder joint.

25. The system according to claim 23, wherein the measuring arm further includes:
a first joint for providing a twisting motion between the head member and the first link;
a second joint for providing a twisting motion between the first link and the second link; and
a third joint for providing a twisting motion between the second link and the support member.

26. A method of measuring a three-dimensional coordinate by a multi-joint coordinate measuring system, the system including a support member, a multi-joint measuring arm having a first end attached to the support member and a second end, a probe installed at the second end of the measuring arm, and a counter balance configured to generate a force raising the measuring arm against gravity, the method comprising:
inputting a plurality of joint angle data from the measuring arm;
calculating from the input data a three-dimensional coordinate corresponding to a position of the probe, by a formula including a term for correcting an error due to a change of the force generated by the counter balance; and
outputting the three-dimensional coordinate.

27. A multi-joint coordinate measuring system comprising:
a support member;
a multi-joint measuring arm having a first end attached to the support member, a second end at which a probe can be installed, and a plurality of joints;
a memory that outputs a prescribed value concerning a posture of the measuring arm, the prescribed value having been determined such that a measurement error due to a user action pulling the measuring arm away from the support member would become within an allowable range;
a processor configured to produce a three-dimensional coordinate corresponding to a position of the probe based on an angle of each joint of the measuring arm, to determine a parameter concerning the posture of the measuring arm, and to detect the determined parameter exceeding the prescribed value of the memory; and
a warning indicator configured to warn a user in accordance with a result of the detection by the processor.

28. A multi-joint coordinate measuring system comprising:
a support member;
a multi-joint measuring arm having a first end attached to the support member, a second end at which a probe can be installed, and a plurality of joints;
a counter balance configured to generate a force raising the measuring arm against gravity;
a memory that outputs a prescribed value concerning a posture of the measuring arm, the prescribed value having been determined such that a measurement error due to a user action moving the measuring arm with a chance in the force applied to the measuring arm by the counter balance would become within an allowable range;
a processor configured to produce a three-dimensional coordinate corresponding to a position of the probe based on an angle of each joint of the measuring arm, to determine a parameter concerning the posture of the measuring arm, and to detect the determined parameter exceeding the prescribed value of the memory; and
a warning indicator configured to warn a user in accordance with a result of the detection by the processor.

29. A multi-joint coordinate measuring system comprising:
a support member;
a multi-joint measuring arm having a first end attached to the support member, a second end at which a probe can be installed, and a plurality of joints;
a processor configured to produce a three-dimensional coordinate corresponding to a position of the probe based on an angle of each joint of the measuring arm; and
a warning indicator that warns a user in response to a determination of a distance of the measuring arm's reach and a detection of a condition that the determined distance exceeds a prescribed value.

* * * * *

UNITED STATES PATENT AND TRADEMARK OFFICE
CERTIFICATE OF CORRECTION

| | | |
|---|---|---|
| PATENT NO. | : 7,051,447 B2 | Page 1 of 1 |
| APPLICATION NO. | : 10/787483 | |
| DATED | : May 30, 2006 | |
| INVENTOR(S) | : Akira Kikuchi, Kenji Araka and Katsumi Oshiro | |

It is certified that error appears in the above-identified patent and that said Letters Patent is hereby corrected as shown below:

In claim 19, column 18, line 22, "chance" should read --change--

In claim 28, column 20, line 19, "chance" should read --change--

Signed and Sealed this

Twenty-sixth Day of December, 2006

JON W. DUDAS
*Director of the United States Patent and Trademark Office*